United States Patent
Khabashesku

(10) Patent No.: US 9,012,579 B2
(45) Date of Patent: Apr. 21, 2015

(54) IONOMER COMPOSITIONS AND METHODS OF MAKING AND USING SAME

(71) Applicant: Fina Technology, Inc., Houston, TX (US)

(72) Inventor: Olga Khabashesku, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 18 days.

(21) Appl. No.: 14/013,596

(22) Filed: Aug. 29, 2013

(65) Prior Publication Data

US 2014/0005290 A1    Jan. 2, 2014

Related U.S. Application Data

(62) Division of application No. 12/403,263, filed on Mar. 12, 2009, now Pat. No. 8,563,641.

(51) Int. Cl.
| | |
|---|---|
| *C08F 30/04* | (2006.01) |
| *C08F 212/08* | (2006.01) |
| *C08F 212/00* | (2006.01) |
| *C08K 5/00* | (2006.01) |
| *C08L 25/08* | (2006.01) |

(52) U.S. Cl.
CPC ............. *C08F 212/08* (2013.01); *C08F 212/00* (2013.01); *C08K 5/00* (2013.01); *C08L 25/08* (2013.01)

(58) Field of Classification Search
USPC .................. 524/396, 577, 578; 526/240, 241, 526/346–347.1
See application file for complete search history.

(56) References Cited

U.S. PATENT DOCUMENTS

| | | | | |
|---|---|---|---|---|
| 4,065,537 | A * | 12/1977 | Miller et al. ................... | 264/143 |
| 4,740,557 | A * | 4/1988 | Nakai et al. ..................... | 525/78 |
| 5,322,869 | A * | 6/1994 | Yamasaki et al. ............. | 524/117 |
| 7,442,736 | B2 * | 10/2008 | Jordan .......................... | 524/108 |
| 2013/0251665 | A1 * | 9/2013 | Munro ....................... | 424/78.06 |

* cited by examiner

*Primary Examiner* — Peter D Mulcahy

(57) ABSTRACT

A method comprising contacting at least one metal salt of an organic acid with at least one aromatic compound in a reaction zone under conditions suitable for the formation of a polymer, wherein the metal salt of an organic acid comprises a metal and at least one unsaturated organic acid moiety. A composition comprising polystyrene and a metal salt of cinnamic acid. An article made from a composition comprising polystyrene and a metal salt of cinnamic acid. A composition comprising polystyrene and a salt of a fatty acid. An article made from a composition comprising polystyrene and a salt of a fatty acid.

20 Claims, No Drawings

IONOMER COMPOSITIONS AND METHODS OF MAKING AND USING SAME

CROSS-REFERENCE TO RELATED APPLICATIONS

This application is a divisional of U.S. application Ser. No. 12/403,263, filed on Mar. 12, 2009.

STATEMENT REGARDING FEDERALLY SPONSORED RESEARCH OR DEVELOPMENT

Not applicable.

REFERENCE TO A MICROFICHE APPENDIX

Not applicable.

BACKGROUND

1. Technical Field

This disclosure relates to polymeric compositions. More specifically, this disclosure relates to polymeric compositions for the preparation of ionomers.

2. Background

Ionomers are widely used in the manufacturing of a variety of end-use articles ranging from medical devices to food containers. Ionomers that are copolymers of styrene and methacrylic acid comprise some of the most widely used thermoplastic materials with a range of applications including disposable medical products, food packaging, tubing, and point-of-purchase displays.

Ionomers comprising aromatic moieties interconnected with ionic moieties may provide improved mechanical and/or physical properties when compared to polymers lacking the ionic moieties. Of particular interest are ionomers comprising aromatic moieties with a branched backbone, for example ionomers comprising styrene. While styrenic based polymers typically possess linear backbones, branched styrene-based polymers, which are generally termed branched aromatic ionomers, are desirable as they typically exhibit higher melt strengths than linear congeners at similar melt flows. However, the application of these branched aromatic ionomers can be limited by production difficulties (e.g., gel formation and reactor fouling) as well as end-use processing limitations. Thus, an ongoing need exists for compositions and methodologies for the production of branched aromatic ionomer compositions having improved properties.

SUMMARY

Disclosed herein is a method comprising contacting at least one metal salt of an organic acid with at least one aromatic compound in a reaction zone under conditions suitable for the formation of a polymer, wherein the metal salt of an organic acid comprises a metal and at least one unsaturated organic acid moiety.

Also disclosed herein is a composition comprising polystyrene and a metal salt of cinnamic acid. Further disclosed herein is an article made from a composition comprising polystyrene and a metal salt of cinnamic acid.

Also disclosed herein is a composition comprising polystyrene and a salt of a fatty acid. Further disclosed herein is an article made from a composition comprising polystyrene and a salt of a fatty acid.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are methods of preparing aromatic ionomers. In an embodiment, the aromatic ionomer comprises one or more branched aromatic based polymers having one or more ionic moieties. Compositions comprising branched aromatic based polymers having one or more ionic moieties are hereinafter termed aromatic ionomer compositions (AIC).

In an embodiment, a method of preparing an AIC comprises a copolymer formed by contacting a salt of an organic acid (i.e., a source compound or precursor for the ionic moiety) with an aromatic compound and optionally other components in a reaction zone under conditions suitable for polymerization of an AIC. AICs of the type described herein may display desirable physical and/or mechanical properties.

In an embodiment, one or more aromatic compounds are used as monomers for the formation of the AIC and are included in same as repeating units. Aromatic compounds are chemical compounds that contain conjugated planar ring systems with delocalized pi electron clouds (i.e., aromatic groups). Examples of aromatic compounds suitable for this disclosure include without limitation vinyl aromatic compounds such as styrene.

In an embodiment, the aromatic compound comprises a styrenic polymer (e.g., polystyrene) formed by polymerization of styrene, wherein the styrenic polymer may be a styrenic homopolymer or a styrenic copolymer. Styrene which is also known as vinyl benzene, ethylenylbenzene, and phenylethene, and is an organic compound represented by the chemical formula $C_8H_8$. Styrene is widely and commercially available and as used herein the term styrene includes a variety of substituted styrenes (e.g., alpha-methyl styrene), ring-substituted styrenes (e.g., t-butylstyrene, p-methylstyrene) as well as unsubstituted styrenes (e.g., vinyl toluene).

In an embodiment, the aromatic compound is present in the AIC in an amount of from 1.0 to 99.9% weight percent by total weight of the AIC, alternatively from 5 wt. % to 99 wt. %, alternatively from 10 wt. % to 95 wt. %.

In an embodiment, one or more salts of one or more organic acids are used as monomers for the formation of the AIC, which become the ionic moiety in the AIC. Salts of organic acids suitable for use in this disclosure include for example and without limitation metal salts of organic acids. In an embodiment, the metal salt of an organic acid may comprise a metal and at least one unsaturated organic acid moiety, alternatively a metal, at least one saturated organic acid moiety and at least one unsaturated organic acid moiety (i.e., asymmetric salts).

In an embodiment, the metal salt of an organic acid comprises a metal. In some embodiments, the metal comprises Li, Na, K, Rb, Cs, Ca, Sr, Ba, Mg, Al, Zn, Mn, Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, or combinations thereof. Various factors may be considered in the selection of the metal to employ in the metal salts. For example, in determining a suitable transition metal, the relative ease at which the metal's ligands are displaced to form metal salt upon reaction with the organic acid may be considered. In an embodiment, the metal comprises calcium, alternatively cadmium, alternatively zinc.

In an embodiment, the metal salt of an organic acid comprises an organic acid. Generally, organic acids are weak acids that do not dissociate completely in water but are soluble in organic solvents. In an embodiment, the organic acid comprises a vinyl group that can be incorporated into polystyrene as a random copolymer. Organic acids suitable for use in this disclosure include for example and without limitation cinnamic acid, benzoic acid, crotonic acid, itaconic acid, phenylcinnamic acid, a-methylcinnamic acid, fatty acid, such as undecylenic acid, or combinations thereof. In an embodiment, the organic acid comprises a styrene derivative, alternatively a styrene derivative comprising a carboxylic acid moiety.

In an embodiment, the metal salt of an organic acid comprises zinc cinnamate, calcium cinnamate, cadmium cinnamate, zinc undecylenate, zinc cinnamate benzoate, zinc cinnamate acetate, or combinations thereof.

In an embodiment, the metal salt of an organic acid is present in the AIC in an amount of from 200 to 2000 parts per million (ppm) by total weight of the AIC, alternatively from 500 to 1500 ppm, alternatively from 750 to 1000 ppm.

In an embodiment, a process for production of the AIC comprises contacting one or more aromatic compounds and one or more organic acid salts under reaction conditions, and optionally in the presence of one or more initiators, suitable for co-polymerization of the reactants to form the AIC. Suitable aromatic compounds and salts of organic acids have been described previously herein.

In an embodiment, a process for the production of the AIC additionally comprises contacting the composition with at least one initiator. Any initiator capable of free radical formation that facilitates the polymerization of aromatic compound may be employed. Such initiators include by way of example and without limitation organic peroxides. Examples of organic peroxides useful for polymerization initiation include without limitation benzoyl peroxide, lauroyl peroxide, t-butyl peroxybenzoate, 1,1-di-t-butylperoxy-2,4-di-t-butylcyclohexane, diacyl peroxides, peroxydicarbonates, monoperoxycarbonates, peroxyketals, peroxyesters, dialkyl peroxides, hydroperoxides, or combinations thereof. The selection of initiator and effective amount will depend on numerous factors (e.g., temperature, reaction time) and can be chosen by one skilled in the art with the benefits of this disclosure to meet the needs of the process. Polymerization initiators and their effective amounts have been described in U.S. Pat. Nos. 6,822,046; 4,861,127; 5,559,162; 4,433,099; and 7,179,873, each of which is incorporated by reference herein in its entirety.

In an embodiment, a process for the production of the AIC uses heat as an initiator. In such embodiments, the composition may be heated to a temperature in the range of from 90° C. to 130° C., alternatively from 100° C. to 120° C., alternatively from 105° C. to 115° C., and alternatively about 110° C.

In an embodiment, the polymerization reaction to form the AIC may be carried out in a solution or mass polymerization process. Mass polymerization, also known as bulk polymerization refers to the polymerization of a monomer in the absence of any medium other than the monomer and a catalyst or polymerization initiator. Solution polymerization refers to a polymerization process in which the monomers and polymerization initiators are dissolved in a non-monomeric liquid solvent at the beginning of the polymerization reaction. The liquid is usually also a solvent for the resulting polymer or copolymer.

The polymerization process can be either batch or continuous. In an embodiment, the polymerization reaction may be carried out using a continuous production process in a polymerization apparatus comprising a single reactor or a plurality of reactors. For example, the polymeric composition can be prepared using an upflow reactor. Reactors and conditions for the production of a polymeric composition are disclosed in U.S. Pat. No. 4,777,210, which is incorporated by reference herein in its entirety.

The temperature ranges useful with the process of the present disclosure can be selected to be consistent with the operational characteristics of the equipment used to perform the polymerization. In one embodiment, the temperature range for the polymerization can be from 90° C. to 240° C. In another embodiment, the temperature range for the polymerization can be from 100° C. to 180° C. In yet another embodiment, the polymerization reaction may be carried out in a plurality of reactors with each reactor having an optimum temperature range. For example, the polymerization reaction may be carried out in a reactor system employing a first and second polymerization reactors that are either continuously stirred tank reactors (CSTR) or plug-flow reactors. In an embodiment, a polymerization reactor for the production of an AIC of the type disclosed herein comprising a plurality of reactors may have the first reactor (e.g., a CSTR), also known as the prepolymerization reactor, operated in the temperature range of from 90° C. to 135° C. while the second reactor (e.g., CSTR or plug flow) may be operated in the range of from 100° C. to 165° C.

The polymerized product effluent from the first reactor may be referred to herein as the prepolymer. When the prepolymer reaches the desired conversion, it may be passed through a heating device into a second reactor for further polymerization. The polymerized product effluent from the second reactor may be further processed as described in detail in the literature. Upon completion of the polymerization reaction, an AIC is recovered and subsequently processed, for example devolatized, pelletized, etc.

In an embodiment, the AIC may also comprise additives as deemed necessary to impart desired physical properties, such as, increased gloss or color. Examples of additives include without limitation stabilizers, chain transfer agents, talc, anti-oxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and/or other additives known to one skilled in the art with the aid of this disclosure. The aforementioned additives may be used either singularly or in combination to form various formulations of the composition. For example, stabilizers or stabilization agents may be employed to help protect the polymeric composition from degradation due to exposure to excessive temperatures and/or ultraviolet light. These additives may be included in amounts effective to impart the desired properties. Effective additive amounts and processes for inclusion of these additives to polymeric compositions may be determined by one skilled in the art with the aid of this disclosure. For example, one or more additives may be added after recovery of the AIC, for example during compounding such as pelletization. Alternatively or additionally to the inclusion of such additives in the aromatic polymer component of the AICs, such additives may be added during formation of the AIC or to one or more other components of the AICs.

The resultant composition (i.e., AIC) may comprise branched aromatic ionomers. The AICs display improved physical and/or mechanical properties when compared to an otherwise similar composition prepared in the absence of the metal salts of organic acids of the type described herein (e.g., cinnamate salts). However, other salts of the type previously described herein are also contemplated. Hereinafter, the disclosure of properties is made in comparison to a polystyrene homopolymer.

AICs prepared as described herein may comprise higher molecular weight components. The weight-average molecular weight $M_w$ is given by equation 1:

$$M_w = \Sigma w_x M_x \quad \text{(Equation 1)}$$

where $w_x$ is the weight-fraction of molecules whose weight is $M_x$. The $M_w$ is related to polymer strength properties such as tensile strength and impact resistance. In an embodiment, the AICs of this disclosure have an $M_w$ of from 200 kDaltons to 320 kDaltons, alternatively from 220 kDaltons to 300 kDaltons, alternatively from 240 kDaltons to 280 kDaltons as determined by ASTM D-5296.

The AICs of this disclosure may be further characterized by a higher z-average molecular weight ($M_z$). The z-average molecular weight ($M_z$) is given by equation 2:

$$M_z = \Sigma w_x M_x^2 / \Sigma w_x M_x \quad \text{(Equation 2)}$$

where $w_x$ is the weight-fraction of molecules whose weight is $M_x$. $M_z$ is related to polymer ductile properties such as elongation and flexibility. In an embodiment, the AICs of this disclosure have an $M_z$ of equal to or greater than 380 Daltons, alternatively equal to or greater than 400 Daltons, alternatively equal to or greater than 420 Daltons as determined by ASTM D-5296.

In an embodiment, the addition of a comonomer of this disclosure to a polymer of styrene results in an AIC with a $T_g$ from 90° C. to 130° C., alternatively from 100° C. to 120° C., alternatively from 105° C. to 110° C., as determined in accordance with ASTM E1356-03 Standard Test Method for Assignment of the Glass Transition Temperatures by Differential Scanning calorimetry. The $T_g$ is the temperature at which amorphous polymers undergo a second order phase transition from a rubbery, viscous amorphous solid to a brittle, glassy, amorphous solid. The level of reduction of the AIC's. $T_g$ may depend on the amount of comonomer added.

In an embodiment, the AICs of this disclosure may have a lowered melt flow rate (MFR). For example, the AICs may have an MFR of from 1 g/10 min. to 3 g/10 min., alternatively from 1.2 g/10 min. to 2.5 g/10 min., alternatively from 1.5 g/10 min. to 2 g/10 min. The MFR may be determined using a dead-weight piston plastometer that extrudes polystyrene through an orifice of specified dimensions at a temperature of 230° C. and a load of 2.16 kg in accordance with ASTM Standard Test Method D-1238.

The AICs have a melt strength of from 0.01 Newton (N) to 0.06 N, alternatively from 0.015 N to 0.05 N, alternatively from 0.02 N to 0.04 N. The melt strength refers to the strength of the plastic while in the molten state wherein the melt strength is measured by the hang time of a 150 gram parison at 210° C. immediately following extrusion from a 0.1 inch die gap.

The AICs of this disclosure may be converted to end-use articles by any suitable method. In an embodiment, this conversion is a plastics shaping process such as blowmoulding, extrusion, injection blowmoulding, injection stretch blowmoulding, thermoforming, and the like.

The AICs may also be used to prepare foamed polymeric compositions. For example, the AIC may be mixed, melted, and foamed via extrusion, and the melted and foamed copolymer fed to a shaping device (e.g., mold, die, lay down bar, etc.). The foaming of the AIC may occur prior to, during, or subsequent to the shaping. Alternatively, the molten AIC may also be injected into a mold, where the composition undergoes foaming and fills the mold to form a shaped end-use article.

The AIC may also be used in sheet applications. In an embodiment, the AIC is formed into a sheet, which is then subjected to further processing steps such as thermoforming to produce an end-use article. The AIC may also be used to prepare oriented styrenic polymer compositions. Oriented polystyrene (OPS) may be produced by forming or casting a film and stretching the film in two directions. This allows the polystyrene molecules to align themselves, thus, improving mechanical properties.

The AIC may also be used to manufacture molded articles. By having a higher melt flow while retaining adequate physical properties, the molding cycle time may be reduced, thus allowing increased manufacturing productivity. The AICs may be used in blends and alloys with polar polymers such as polyethylene terephthalate and polycarbonate.

The AICs of this disclosure may be converted to end-use articles by any suitable process and used to manufacture extruded articles, such as foam, and extruded and/or oriented sheets or film. Examples of end use articles into which the AICs of this disclosure may be formed include food packaging, office supplies, plastic lumber, replacement lumber, patio decking, structural supports, laminate flooring compositions, polymeric foam substrate, decorative surfaces (i.e., crown molding, etc), weatherable outdoor materials, point-of-purchase signs and displays, housewares and consumer goods, building insulation, cosmetics packaging, outdoor replacement materials, lids and containers (i.e., for deli, fruit, candies and cookies), appliances, utensils, electronic parts, automotive parts, enclosures, protective head gear, reusable paintballs, toys (e.g., LEGO bricks), musical instruments, golf club heads, piping, business machines and telephone components, shower heads, door handles, faucet handles, wheel covers, automotive front grilles, and so forth.

EXAMPLES

The disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

Various AIC samples were prepared using the methodologies disclosed herein and their properties were compared to a commercially available sample of polystyrene and to a sample comprising polystyrene methylmethacrylate (PS-MMA). Sample 1 is a polystyrene homopolymer and was prepared using a feed comprising crystal grade polystyrene PS-Xtal which is commercially available from Total Petrochemicals USA, Inc. and 170 ppm of LUPEROX 233 (L-233) initiator. L-233 is ethyl 3,3-d(t-butylperoxy)butyrate which is an organic peroxide initiator commercially available from ARKEMA. Sample 2 was a PS-MMA prepared using a feed comprising approximately 20-30 ml of PS-Xtal and 800 ppm of zinc dimethacrylate (ZnDMA) which is commercially available from Aldrich.

Samples 3 to 15 were prepared using approximately 20-30 ml of PS-Xtal and various zinc salts of organic acids at the amounts indicated in Table 1. All samples were batch polymerized at 131° C. in a reactor vessel.

The weight average molar mass ($M_w$), the z average molar mass ($M_z$), the glass transition temperature (Tg), the melt flow index (MFI) (also termed the melt flow rate), and the melt strength of Samples 1-15 were determined using the methodologies disclosed previously herein and the results are tabulated in Table 1.

TABLE 1

| Sample | Cross-linking monomer system | Amount of Salt ppm | Mw (kilo Daltons) | Mz (kilo Daltons) | Tg °C. | MFI g/10 min | Melt Strength (N) |
|---|---|---|---|---|---|---|---|
| 1 | PS Xtal ((L-233) | n/a | 240 | 377 | 107.4 | 2.43 | 0.024 |
| 2 | ZnDMA (Aldrich) | 800 | 273 | 414 | 107.8 | 1.36 | 0.064 |
| 3 | ZnCin$_2$ | 800 | 279 | 421 | 107.5 | 1.61 | 0.039 |
| 4 | ZnCin$_2$ | 1500 | 274 | 410 | 109 | 1.64 | 0.037 |
| 5 | CaCin$_2$ | 1200 | 253 | 400 | 108.9 | 2.34 | 0.020 |
| 6 | CaCin$_2$ | 800 | n/a | n/a | n/a | 1.82 | 0.025 |
| 7 | ZnCinAc | 800 | 281 | 424 | 107.7 | 1.44 | 0.033 |
| 8 | ZnCinBz | 400 | 271 | 410 | 108 | 1.95 | 0.028 |
| 9 | ZnCinBz | 800 | 264 | 408 | 108.6 | 2.17 | 0.031 |
| 10 | CdCin$_2$ | 975 | n/a | n/a | n/a | 1.70 | 0.028 |
| 11 | ZnUn | 200 | 279 | 423 | 108.7 | 1.71 | 0.030 |
| 12 | ZnUn | 400 | 278 | 426 | 109.3 | 1.91 | n/a |
| 13 | ZnUn | 800 | 278 | 419 | 106 | 1.79 | 0.028 |
| 14 | ZnUn | 1200 | 278 | 418 | 105.9 | 1.81 | n/a |
| 15 | ZnUn | 2000 | 275 | 417 | 106.3 | 1.94 | 0.024 |

Referring to Table 1, Zn(DMA) is zinc dimethacrylate, Zn(Cin)$_2$ is zinc cinnamate, CaCin$_2$ is calcium cinnamate, ZnCinAc is zinc cinnamate acetate, ZnCinBz is zinc cinnamate benzoate, CdCin$_2$ is cadmium cinnamate, ZnUn is zinc undecylenate. The value of Mz obtained for the zinc containing samples (Samples 3, 4, 7, 8, 9, 11-15) ranged from 408 to 426, which are comparable to the Mz value for the PS-MMA using ZnDMA (Sample 2) of 414. Since the Mz values of PS-MMA are characteristic of branched polymers, the Mz values for the AIC of the disclosure (Samples 3, 4, 7, 8, 9, and 11-15) suggests the samples have a branched structure. Additionally, the MFI of Samples 3-15 ranged from 1.44 to 2.34, which falls within the range of values obtained for a PS-MMA of 1.36 (Sample 2) and a polystyrene homopolymer of 2.43 (Sample 1).

The melt strength values for Samples 3-15, with the exception of Sample 5 (CaCin$_2$), within the range of values obtained for a PS-MMA (Sample 2) and a polystyrene homopolymer (Sample 1). CaCin$_2$ may show melt strength values outside the range due to the low solubility of CaCin$_2$ salt.

The asymmetric zinc salts of zinc cinnamate acetate and zinc cinnamate benzoate (Samples 7-9) displayed a Mw that was comparable to that obtained using zinc cinnamate (Samples 3-4). Further, a comparison of Samples 5, 6, and 10, indicated that substitution of the zinc cation in the AICs with cations of larger radii such as cadmium and smaller radii such as calcium resulted in lowered melt strengths.

Finally, the samples prepared using zinc undecylenate (Samples 11-15) displayed high Mw and Mz values without a substantial increase in stiffness as reflected in high MFI values. These data suggest that the samples prepared using zinc undecylenate had a substantial amount of crosslinking. These results for zinc undecylenate contradict data on the physical properties of styrene ionomers with carboxylic acid moiety attached to alkyl chain spacer with variable length as describe by Eisenberg A., Gauthier M., "*Alkylated Styrene Ionomers with Variable Length Spacers. Physical Properties*", Macromol., 1990, 23, 2066-2074 and Eisenberg A., Kim J. S., "*Introduction to Ionomers*", Wiley Interscience, 1998, New York, N.Y., each of which is incorporated by reference herein it its entirety. The glass transition temperatures of the samples prepared with the cinnamate salts were comparable to that of the control samples.

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k^*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A composition comprising a copolymer, wherein the copolymer is a copolymer of an aromatic compound and a metal salt of cinnamic acid, wherein the aromatic compound is present in an amount of from 1 wt. % to 99.9 wt. % based on a total weight of the composition, and wherein the metal salt of cinnamic acid is present in an amount of from 200 ppm to 2000 ppm based on the total weight of the composition.

2. The composition of claim 1 wherein the metal salt of cinnamic acid is selected from the group consisting of zinc cinnamate, zinc cinnamate acetate, zinc cinnamate benzoate, calcium cinnamate, cadmium cinnamate, and combinations thereof.

3. An article made from the composition of claim 1.

4. The composition of claim 1, wherein the aromatic compound is styrene.

5. The composition of claim 1, wherein the metal salt of cinnamic acid is present in an amount of from 500 ppm to 1500 ppm based on the total weight of the composition.

6. The composition of claim 1, wherein the metal comprises main group metals, metals from groups 3 to 12 of the periodic table, or combinations thereof.

7. The composition of claim 1, wherein the metal is selected from the group consisting of zinc, calcium, cadmium, and combinations thereof.

8. The composition of claim 1, wherein the aromatic compound is present in an amount of from 5 wt. % to 99 wt. % based on the total weight of the composition.

9. The composition of claim 1, wherein the composition has a weight-average molecular weight of from 200 kilo Daltons to 320 kilo Daltons.

10. The composition of claim 1, wherein the composition has a z-average molecular weight of equal to or greater than 380 kilo Daltons.

11. The composition of claim 1, wherein the composition has a glass transition temperature of from 90° C. to 130° C.

12. The composition of claim 1, wherein the composition has a melt flow rate of from 1 g/10 min. to 3 g/10 min.

13. The composition of claim 1, wherein the composition has a melt strength of from 0.01 Newton (N) to 0.06 N.

14. The composition of claim 1, wherein the composition is blended with one or more polar polymers.

15. The composition of claim 14, wherein the polar polymers comprise polyethylene terephthalate and polycarbonate.

16. The article of claim 3, wherein the article is a blow-moulded article, an extruded article, an injection blowmoulded article, an injection stretch blowmoulded article, or a thermoformed article.

17. The article of claim 3, wherein the article is a foamed article.

18. The article of claim 3, wherein the article is a cast film or an oriented film.

19. A branched copolymer of styrene and a metal salt of cinnamic acid, wherein the styrene is present in an amount of from 1 wt. % to 99.9 wt. % based on a total weight of the copolymer, and wherein the metal salt of cinnamic acid is present in an amount of from 200 ppm to 2000 ppm based on the total weight of the copolymer.

20. A branched copolymer of an aromatic compound and a metal salt of cinnamic acid, wherein the aromatic compound is present in an amount of from 1 wt. % to 99.9 wt. % based on a total weight of the copolymer, and wherein the metal salt of cinnamic acid is present in an amount of from 200 ppm to 2000 ppm based on the total weight of the copolymer.

* * * * *